United States Patent [19]

Love et al.

[11] 4,303,517

[45] Dec. 1, 1981

[54] LIQUID TREATMENT APPARATUS

[75] Inventors: Leonard S. Love, Mississauga; Roger N. Crathern, Inglewood, both of Canada

[73] Assignee: Sydlo Inc., Mississauga, Canada

[21] Appl. No.: 211,872

[22] Filed: Dec. 1, 1980

Related U.S. Application Data

[63] Continuation of Ser. No. 156,149, Jun. 3, 1980, abandoned, which is a continuation of Ser. No. 3,321, Jan. 15, 1979, abandoned.

[51] Int. Cl.³ .......................... C02F 1/52; B01D 21/01
[52] U.S. Cl. ................................. 210/208; 210/520; 210/521; 210/528
[58] Field of Search ................. 210/97, 137, 194, 197, 210/207, 208, 199, 219, 220, 221.1, 519, 520, 521, 522, 525, 527, 528, 530

[56] References Cited

U.S. PATENT DOCUMENTS

| Re. 21,109 | 6/1939 | Sayers et al. | 210/220 |
|---|---|---|---|
| Re. 21,940 | 11/1941 | Darby | 210/528 |
| 1,076,666 | 10/1913 | Dorr | 210/221 R |
| 2,080,137 | 5/1937 | Keefer | 210/519 |
| 2,092,620 | 9/1937 | Kivall | 210/530 |
| 2,098,467 | 11/1937 | Sayers et al. | 210/530 |
| 2,140,059 | 12/1938 | Simonsen | 210/220 |
| 2,268,726 | 1/1942 | Turk | 210/220 |
| 2,353,358 | 7/1944 | Prager | 210/220 |
| 2,669,357 | 2/1954 | Kivall et al. | 210/528 |
| 2,708,520 | 5/1955 | Dallas | 210/528 |
| 2,713,026 | 7/1955 | Kelly | 210/528 |
| 3,473,665 | 10/1969 | Duff | 210/188 |
| 3,517,814 | 6/1970 | Minegishi | 210/519 |
| 3,523,889 | 8/1970 | Eis | 210/220 |
| 3,615,025 | 10/1971 | Rice | 210/521 |
| 3,926,805 | 12/1975 | Walker | 210/519 |
| 3,929,640 | 12/1975 | Dohnert | 210/195 |
| 3,951,816 | 4/1976 | Bascope | 210/519 |
| 3,966,617 | 6/1976 | Zaenkert | 210/519 |
| 4,014,791 | 3/1977 | Tuttle | 210/114 |
| 4,038,186 | 7/1977 | Potter et al. | 210/92 |
| 4,054,514 | 10/1977 | Oltmann | 210/197 |
| 4,142,970 | 3/1979 | Von Hagel et al. | 210/522 |

FOREIGN PATENT DOCUMENTS

2160194  10/1973  Fed. Rep. of Germany ...... 210/528

*Primary Examiner*—Ernest G. Therkorn
*Attorney, Agent, or Firm*—Rogers, Bereskin & Parr

[57] ABSTRACT

The apparatus includes a tank of steel, or concrete, into which the liquid to be treated is introduced vertically through a centrally located inlet at the tank bottom. Disposed inside the tank, above said inlet, are a tubular venturi-type eductor member and a conical partition member which defines a liquid mixing, coagulating, flocculating and sludge recirculating zone. As the entering liquid flows through the eductor, it draws in a very large volume of surrounding sludge to establish a high degree of sludge recirculation and mixing.

10 Claims, 4 Drawing Figures

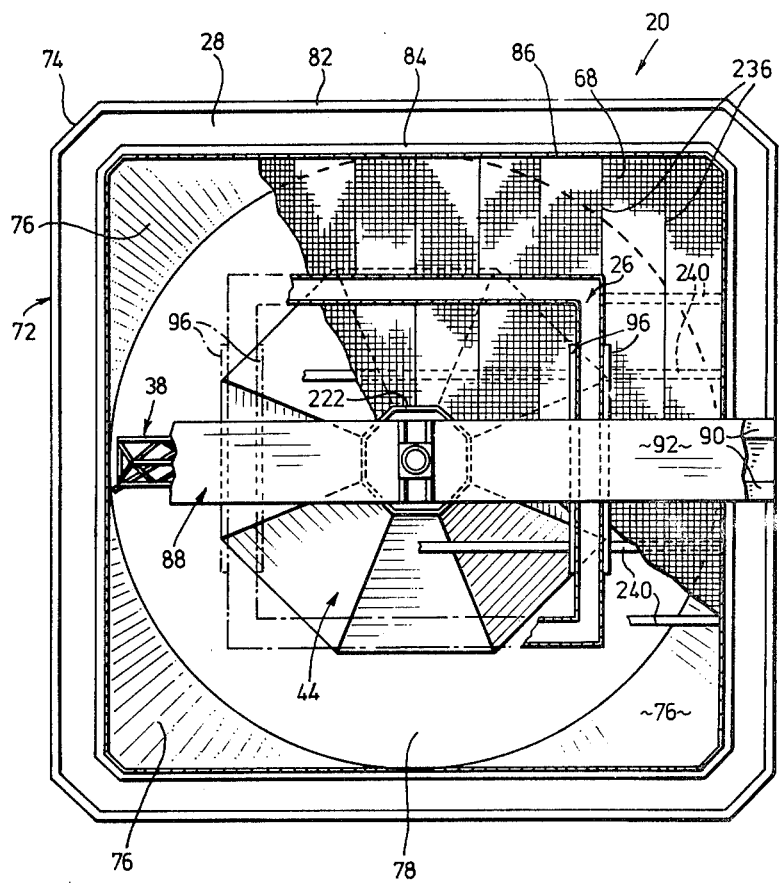

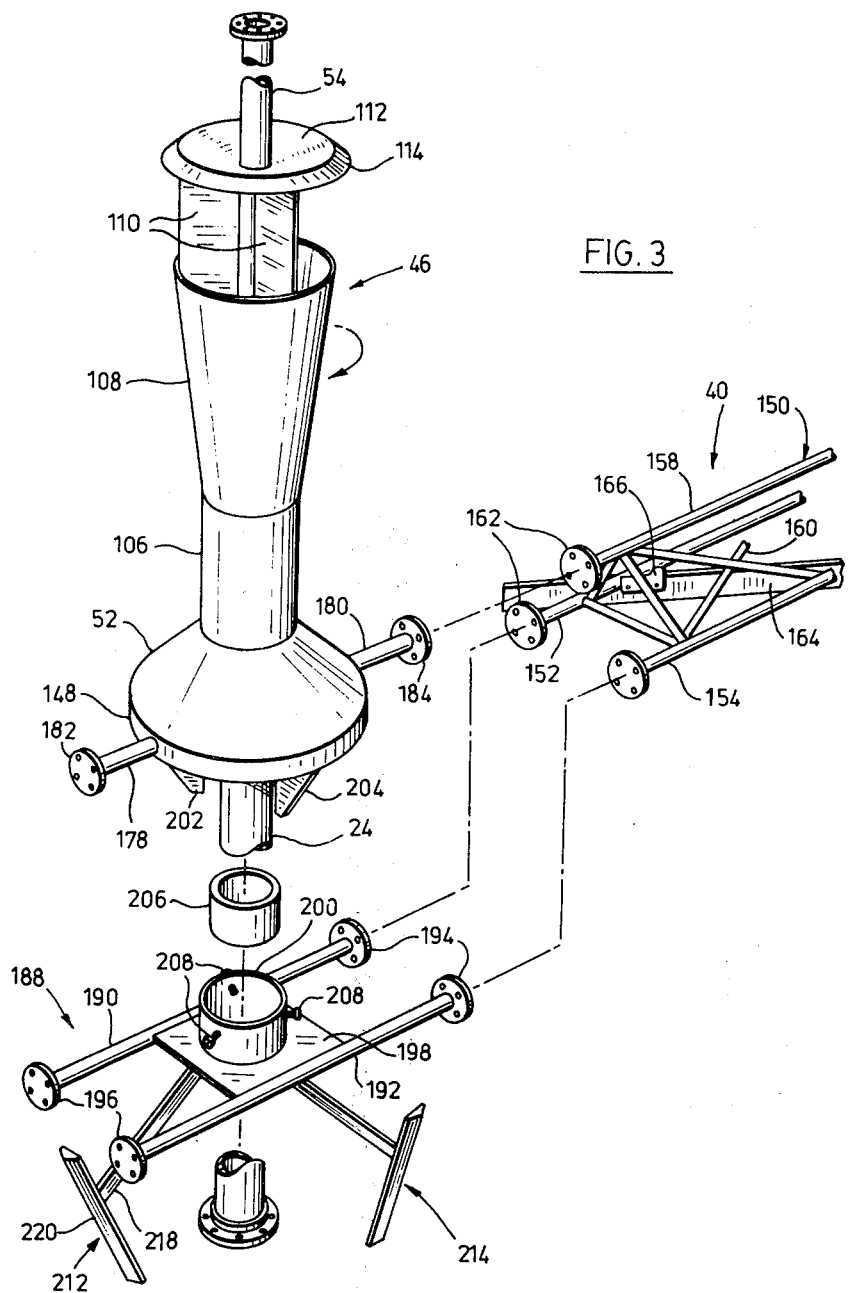

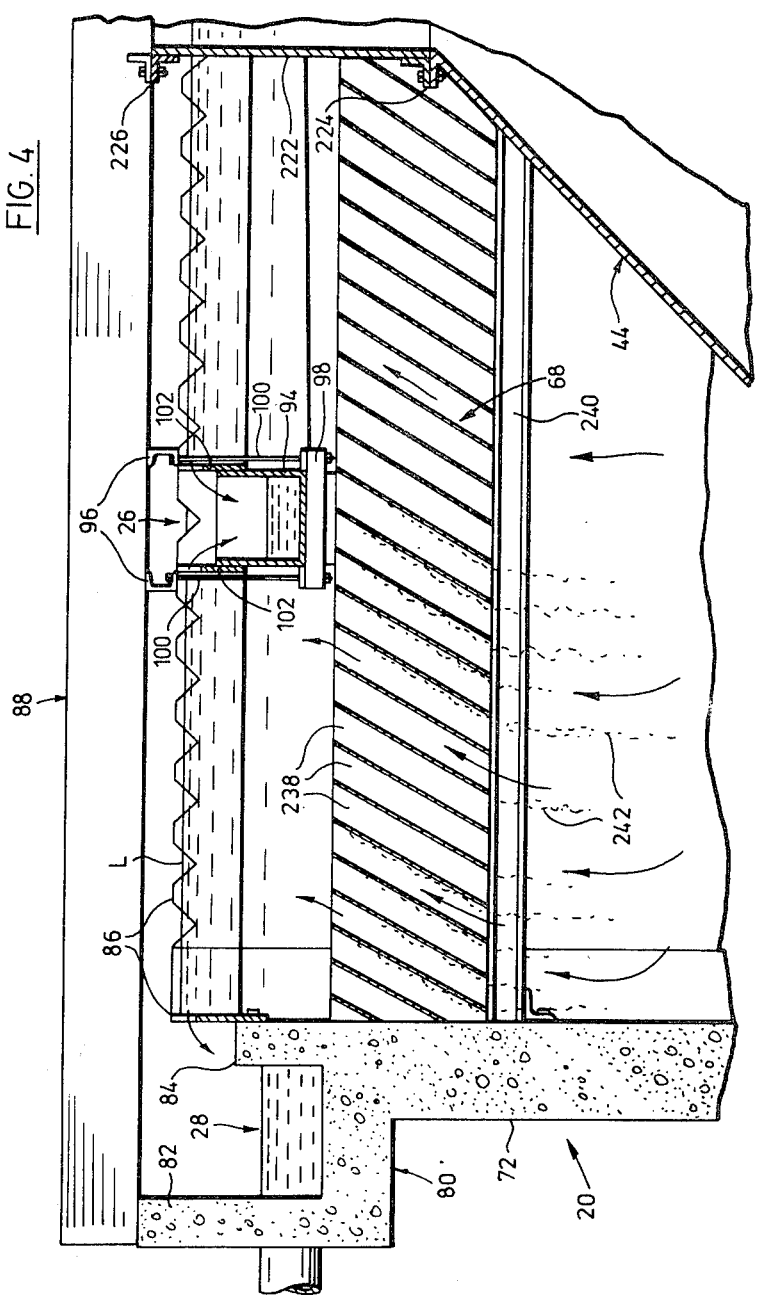

LIQUID TREATMENT APPARATUS

This is a continuation of application Ser. No. 156,149 filed June 3, 1980 which is itself a continuation of prior application Ser. No. 003,321 Jan. 15, 1979, both now abandoned.

This invention relates to an apparatus for the treatment of liquids to remove suspended solids.

In the purification of water or waste liquid (domestic sewage or industrial waste water) it is customary to add certain chemical flocculants (e.g. alum) to the liquid being treated to produce a mass of gelatinous suspended particles commonly called "floc particles". These particles are encouraged to grow in size during a period of mixing, coagulation and flocculation. The "floc particles" combine with suspended matter in the liquid being treated to produce a dense floc which can be removed by gravity settling in a clarifier.

Normally, the liquid being treated is conveyed from its source (e.g. river, lake, industrial plant, municipal sewer) to the treatment facility by conventional pumping equipment. However, since the liquid must be relatively quiescent in the clarifier all of the energy imparted to the liquid by the pumping equipment must be completely disipated before it enters the clarifier.

The United States patent literature contains several examples of liquid treatment apparatus in which flocculation and gravity settling are said to take place in the same tank. An early example of this type of apparatus is shown in U.S. Pat. No. 2,268,726 to Tark. In that case, flocculation is induced by means of a high speed paddle-type mixer. Scraper chains are employed to remove settled sludge from the bottom of the tank. U.S. Pat. Nos. 3,473,665 (Duff) and 3,929,640 (Dohnert) show examples of water treating apparatus in which rotary scraper assemblies are used for scraping settled sludge from the bottom of a settling tank. In each case, the scraper assembly includes a vertical shaft for driving scraper arms which sweep over the bottom wall of the tank. Water is introduced through a series of annular nozzles arranged around the shaft. However, it is believed that this annular nozzle arrangement would not be effective in producing the vigorous mixing action which is required to induce satisfactory flocculation.

An object of the present invention is to provide an improved liquid treatment apparatus in which flocculation and gravity settling can take place in the same tank and in which the vigorous turbulent mixing required for efficient flocculation can be achieved by taking advantage of the energy ordinarily available in the influent water.

The apparatus provided by the invention includes a tank for containing a body of liquid and having a floor. An inlet is provided for liquid to be clarified and is disposed in said floor of the tank and is arranged to direct influent liquid generally vertically upwards into the tank. Liquid outlet means disposed generally at the level of the surface of the body of the liquid, through which clarified liquid can leave the tank. Sludge outlet means is also provided in the floor of the tank through which settled particles can be removed as sludge. Sludge conveyor means is also provided and is operable to convey settled particles towards said sludge outlet means. A generally conical partition member is disposed in the tank above said inlet and defines a circulation zone therebelow. A tubular eductor member having open upper and lower ends is disposed in an upright position below the partition member and generally in aligment with the liquid inlet. The eductor member is arranged relative to said liquid inlet so that liquid entering the tank from the inlet flows upwardly in said member and enters said circulation zone through its open upper end, and liquid and suspended floc particles surrounding said open lower end of the eductor member are entrained by said upward flow of liquid, establishing a recirculation of liquid and suspended particles below said partition member for promoting flocculation of said particles. The portion of the tank outside the partition member defines a relatively quiescent zone for gravity settling of suspended particles.

In order that the invention may be more clearly understood, reference will now be made to the accompanying drawings which illustrate a preferred embodiment of the invention by way of example, and in which:

FIG. 2 is a plan view corresponding to FIG. 1;

FIG. 3 is an exploded perspective view of part of FIG. 1; and

FIG. 4 is a vertical sectional view of part of the apparatus shown in FIG. 1.

Figure 1:
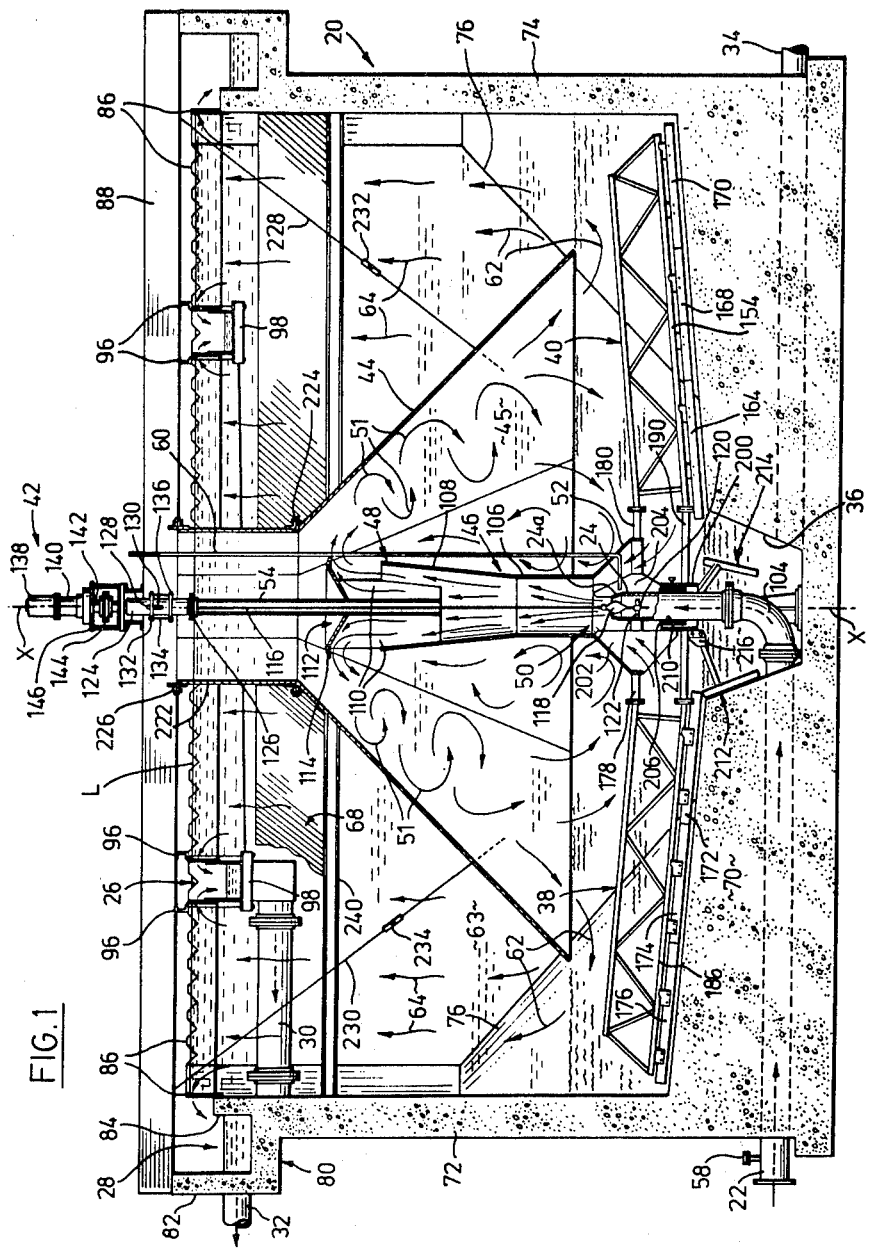
FIG. 1 is vertical section view through a treatment apparatus according to the invention.

The apparatus shown in the drawings has been designed primarily as part of a water purification plant; accordingly, the description which follows will relate specifically to this application of the invention although it is to be understood that the principles involved will be applicable to the purification of other liquids.

Referring first to FIGS. 1 and 2, the apparatus includes a concrete tank 20 of generally square shape for containing a body of water to a level indicated by reference character L. Water to be clarified enters the tank through a raw water inlet pipe 22 from a pumping installation (not shown). Pipe 22 terminates at a vertically arranged nozzle 24 inside the tank. Clarified water leaves the tank by way of an inner launder 26 or an outer launder 28. The launders are interconnected by a pipe 30 and a treated water outlet pipe 32 extends outwardly from the outer launder 28. Floc particles which settle from the water in the apparatus are removed as a sludge through a sludge outlet pipe 34 connected to a central sump 36. A sludge scraper assembly conveys settled sludge towards sump 36 and includes two scraper arms 38 and 40 mounted for rotation about a vertical axis denoted X—X in FIG. 1. An electric drive unit 42 is provided for rotating the scraper arms as will be described.

A generally conical partition member 44 extends about axis X—X and is disposed in tank 20 above inlet nozzle 24, defining a liquid recirculation zone below the member. Member 44 is referred to as a reaction cone and defines a mixing, coagulation and flocculation zone 45 therebelow. Disposed inside cone 44 is a tubular eductor member 46 which also extends about axis X—X and which is positioned generally in alignment with nozzle 24 so that water entering the tank through the nozzle will flow upwardly in the eductor. The eductor has an open upper end 48 through which water enters zone 45 and an open lower end 50. The open lower end 50 of eductor 46 is disposed relative to inlet nozzle 24 so that water entering the eductor from the nozzle entrains surrounding water and suspended particles and a circulation pattern is established below the clarifier reaction cone 44 as indicated by the arrows 51 in FIG. 1. In this particular embodiment a deflection baffle (see later) is provided above the open upper end 48 of the eductor member for laterally diverting liquid leaving the member into said circulation pattern as will be more specifically described later.

At its lower end, eductor 46 has a generally conical inlet 52 to which the scraper arms 38 and 40 are attached as will be described. A tubular driving member 54 extends vertically upwardly from eductor 46 and is attached at its upper end to drive unit 42. Thus, it will be appreciated that the eductor forms part of the sludge scraper assembly and that rotary motion imparted to member 54 by unit 42 will be transmitted to the scraper arms by way of the eductor.

The water entering tank 20 through inlet pipe 22 will be delivered from a pumping installation (not shown) by which the water will have been pumped from a river, lake or other source. Pipe 22 includes an inlet port 58 through which chemical flocculating agents such as alum can be added to the raw water. Complete mixing is accomplished as the flocculating agent and water flow at high velocity through nozzle 24 into the tank. The eductor 46 and reaction cone 44 are designed to allow substantially unrestricted recirculation of the water below the reaction cone and promote a high degree of mixing and sludge recirculate which in turn maintains a high level of floc particles under the cone. Cone 44 confines the turbulent water to the liquid recirculation zone defined by the cone while the water in the remainder of the tank is in the relatively quiescent state required for good settling.

Long chain hydrocarbons known as "polyelectrolytes" can be added through a chemical feed pipe 60 located at the top of the reactor cone. Polyelectrolytes tend to cause pin point floc particles to adhere to one another to form larger particles. A high concentration of floc particles under the cone 44 is required for efficient coagulation and flocculation. This is accomplished by effective turbulent mixing and a high degree of sludge recirculation obtained through the eductor assembly 46. This combined with the addition of polyelectrolytes will promote the formation of large floc particles which have good settling characteristics. A high level of sludge recirculation is required for efficient coagulation and flocculation.

As raw water continuously enters tank 20 from inlet pipe 22 a mixture of floc particles and water flows out around the bottom edge of cone 44, as indicated by arrow 62 in FIG. 1. Heavier, larger particles settle out and fall to the bottom of tank 20. The lighter, smaller particles will rise as indicated by arrows 64. Because of the shape of cone 44 the area available for settling increases as the smaller particles rise. This increase in settling area reduces the upward velocity of the smaller, lighter floc particles and permits them to settle out at a higher level in tank 20. This action effectively forms a suspended blanket of clarified floc particles with the larger heavier particles at the bottom and the smaller, lighter particles at the top. This blanket, denoted 65 is referred to as a suspended sludge blanket.

The suspended sludge blanket 63 acts as a filter medium through which the water is clarified as it flows upward through an array of tube settlers 68 towards the launders 26 and 28. Coagulation and entrapment of smaller particles continues to take place within the suspended sludge blanket 63 and causes them to grow in size and improves their settling ability. Through this action the smaller particles find their way to the bottom of the suspended sludge blanket to the point where they settle out on the floor of tank 20, where they are removed by sludge scraper 38 and 40 to the sump. Those pin point floc particles which are not trapped or coagulated in the "suspended sludge blanket" will continue to rise towards the tube settlers. The tube settlers will be more specifically referred to in connection with FIG. 4. For the present it is sufficient to note from FIG. 4 that the tube settlers cover the entire clarifier surface from inside tank 20 to the outside of cone 44. In this particular embodiment cone 44 occupies a diameter of only 5'0" to maximize the number of tube settlers that can be fitted into a given clarifier area.

Having described the principal components of the apparatus and its operation, the apparatus will now be described in more detail. Referring first to FIGS. 1 and 2, tank 20 has a floor 70, the top surface of which slopes towards the central sump 36. Sidewalls 72 extend vertically upwardly from floor 70 to define the generally rectangular shape of the tank as can best be seen in FIG. 2. It will be noted that the corners of the tank are flattened slightly as indicated at 74 in order to avoid sharp internal corners. Floor 70 includes relatively steeply inclined arcuate portions 76 which can best be seen in FIG. 1 and which are indicated by dotted lines in FIG. 2. It will be seen from this latter view that these arcuate corner portions define a generally circular central area 78 of floor 70 which is relatively flat although nevertheless dished slightly towards sump 36. Only this central portion 78 of floor 70 is swept by the scraper arms 38 and 40 as the sludge scraper assembly rotates in use. Gravity feed is relied on in the case of particles which settle onto the arcuate corner portions of the floor. These particles will form a sludge which will travel down the corner portions into the path of scraper arms 38 and 40.

Adjacent their upper ends, each of the sidwalls 72 is formed with an integral channel-shaped formation 80 having an outer limb 82 and a lower, inner limb 84. The channel-shaped formations 80 merge with one another to define a continuous trough around the top of the tank which forms the outer launder 28. Weir plates such as those indicated at 86 in FIGS. 1 and 4 are bolted to the inside surfaces of the inner limbs 84 of the formations 80 so as to protrude above the tops of the limbs and define the water level in the tank. The weir plates 86 are of conventional form and have saw-tooth shaped upper edges over which the water spills. This edge shaping has been found to be preferable since it avoids levelling problems which are found to occur with straight edged weir plates. The treated water outlet pipe 32 extends through the outer limp 82 of one of the formations 80 for conveying treated water from the apparatus.

A main support beam 88 extends across tank 20 from one side to the other generally on the relevant center line of the tank (see FIG. 2) and is supported on the limbs 82 of the channel-shaped formations 80 of sidewalls (see FIG. 1). Beam 88 is in the form of two longitudinally extending boxed section members 90 disposed at respectively opposite sides of the beam and covered by top and bottom plates, one of which is visible at 92 in FIG. 2 so that the beam overall has a closed rectangular cross-section. Beam 88 supports the sludge scraper assembly and the clarifier reaction cone 44 of the apparatus as will be described. The beam also provides a walkway for maintenance personnel across the top of the tank. Suitable handrails will be provided for safety purposes but are not shown in the drawings. Beam 88 also supports the inner launder 26. It will be seen that this launder is of square shape in plan and is suspended below beam 88 so as to be immersed in the water in tank 20 to a level corresponding substantially to the level of the weir plates 86 of the outer launder. The inner launder is fabricated from four channel-shaped metal sections one of which can clearly be seen at 94 in FIG. 4. Two pairs of launder support arms 96, (each of C-shaped in section) are welded to the underside of the main support beam 88 so as to project outwardly to both sides of the beam substantially at right angles thereto at positions corresponding to the intended position of the inner launder as can best be seen in FIG. 2. Transverse support brackets 98 (FIG. 4) are welded to the underside of the channel members 94 at appropriate positions and are coupled to the launder support arms 96 by tie rods 100. Weir plates 102 of similar shape to the weir plates 86 of the outer launder are bolted to the outer sides of the channel members 94. As indicated previously, the launders are connected by a pipe 30. This pipe connects at its inner end into the channel member 98 of the inner launder and at its outer end into the outer launder 28 so that water collected in the inner launder will travel to the outer launder and, from there, to the treated water outlet pipe 32.

The raw water inlet pipe 22 of the apparatus passes through the bottom wall of the tank to the sump 36 and includes a 90° elbow 104 which is upwardly directed inside the sump 36. Nozzle 24 is fitted to elbow 104 and is in the form of a straight pipe section having a slightly inwardly bevelled upper end 24a. Nozzle 24 terminates inside the generally conical inlet portion 52 of the eductor of 46. The eductor is a sheet metal fabrication designed to provide a venturi-like throat just downstream of nozzle 24. This throat is formed by a generally cylindrical section 106 of the eductor which is of constant cross-sectional shape throughout its length. At its lower end, section 106 is connected to the conical inlet portion 52 of the eductor, while at its upper end the section is connected to an upwardly flared top section 108.

It will be appreciated from the foregoing that as water is discharged from nozzle 24 into the eductor, it enters the throat formed by section 106 at high velocity and causes water and suspended floc particles in the vicinity of the eductor inlet to be entrained and drawn up through the eductor with the incoming water to establish a recirculatory flow as described previously.

Eductor 46 is symmetrical about axis X—X. The vertical driving member 54 from the drive unit 42 is also disposed on axis X—X and extends down a substantial distance into the top eductor section 108. Member 54 is coupled to section 108 by three plates, two of which are indicated at 110 in FIG. 1 which are equiangularly disposed about axis X—X and are disposed in planes which radiate outwardly from the axis. The plates are welded both to member 54 and to the inner surface of section 108.

The support plates 110 project a substantial distance above eductor section 108 and terminate at a top member 112 (see FIG. 3) which defines the deflection baffle referred to above. Member 112 is of inverted conical shape and has a downwardly inclined lip 114 around its periphery. Due to its inverted conical shape member 112 serves to deflect outwardly water and floc particles rising in the top eductor section 108 and assists in establishing the recirculatory pattern below the clarifier reaction cone as discussed above. In other words, water travelling upwardly in the eductor will pass between the support plates 110 and be deflected outwardly through the space between the top member 112 and the upper edge of the top eductor member 108.

Extending vertically downwardly through the tubular driving member 54 is a control rod 116 for a flow adjuster device 118 which is disposed within the open upper end of the water inlet nozzle 24 for varying the rate at which water enters the tank through the nozzle and hence the turbulence of the mixing which takes place below cone 44. Device 118 has the shape of two cones placed with their bases in contact and is positioned on rod 116 so that the device is generally in the mouth of nozzle 24. The portion of rod 116 below the device is received in a collar 120 coupled by a bracket 122 to the sidewall of the nozzle. At its upper end, rod 116 terminates within a coupling tube 124 bolted at a flange 126 to the top end of driving member 54. A cross member 128 is attached to the upper end of rod 116 so as to extend transversely therefrom and protrude through two aligned vertical slots in tube 124, one of which is visible at 130. Cross member 128 is welded to a plate 132 which is loosely fitted around tube 124 and which is coupled by two bolts 134 to a similar plate 136 welded to tube 124. The bolts 134 are adjustable to vary the spacing between the two plates 132 and 136 and hence the vertical position of device 118 and the extent of the annular water inlet opening between the member and the wall of inlet 24.

Drive unit 42 is mounted on the main support beam 88 of the apparatus and includes an electric motor 138 coupled to a speed reducing gear box 140 having an output shaft 142. Shaft 142 is connected to the upper end of the coupling tube 124 by means of a flange type coupling 144. The drive unit is mounted on beam 88 by way of a support bracket 146. The drive unit is designed to rotate the driving member 54 of the sludge scraping assembly at a relatively slow speed so as to cause the scraper arms 38 and 40 to sweep slowly over the bottom wall of tank 20.

As indicated previously, eductor 46 forms part of the sludge scraper assembly and the scraper arms 38 and 40 are connected to the generally conical inlet portion 52 of the eductor.

Referring primarily to FIG. 3, it will be seen that inlet portion 52 slopes downwardly from section 106 of the eductor to a depending flange 148. In FIG. 3, part of scraper arm 40 is visible in an exploded position adjacent the eductor. Since the two scraper arms are essentially the same only arm 40 will be described. The arm includes a frame 150 constructed from seamless black iron pipe and including three main longitudinal members 152, 154 and 158 arranged in a triangular configuration with two of the longitudinal members (152 and 154) defining the base of the triangle and the third member 158 at the top. Bracing struts generally denoted 160 extend between the longitudinal members. At their inner ends, the longitudinal members are each fitted with attachment flanges 162.

Frame 150 carries three scraper blades, one of which is visible at 164, and each of which is attached to the frame by mounting plate such as that indicated at 166 welded to one of the bottom longitudinal members of the frame. Each blade will in fact be provided with two mounting plates welded one to each of the bottom longitudinal frame members. The mounting plates are disposed in oblique positions with respect to the frame members on which they are mounted so that the scraper blades are angled with respect to the length of the arm in the direction such that the blades will tend to convey settled sludge towards the central sump 36 of the tank. Only one of the scraper blades of arm 40 is visible in FIG. 3 although it will be understood that the other two arms will be similarly angled. Those arms are denoted 168 and 170 in FIG. 1. Scraper arm 38 is essentially of similar construction and includes three scraper blades 172, 174 and 176.

Referring back to FIG. 3, the scraper arms are attached to the conical member 52 of eductor 46 by two attachment members 178 and 180 which project outwardly from opposite sides of the flange 148 of eductor inlet 52, generally radially with respect to axis X—X. Each of the members 178 and 180 has a flange 182 and 184 respectively at its outer end which mates with the corresponding flange on the top longitudinal member of the relevant scraper arm. Thus, flange 184 mates with the flange 162 of the top longitudinal member 158 of scraper arm 40 and flange 182 mates with a corresponding flange on arm 38. The mating flanges are coupled together by bolts (not shown).

The bottom longitudinal members 152 and 154 of scraper arm 40 are coupled to the corresponding members of arm 38 (one of which is visible at 186 in FIG. 1) by means of a coupling unit generally indicated at 188 in FIG. 3. Unit 188 includes two parallel tubes 190 and 192 which extend between the bottom longitudinal members of the two scraper arms and which have flanges 194 and 196 at their respective ends. These flanges are bolted to the corresponding flanges on the longitudinal members of the scraper arms. The two tubes 190 and 192 are joined by a plate 198 having an upwardly extending sleeve 200 on its top surface.

As can best be seen in FIG. 1, in the assembled apparatus, coupling unit 188 is positioned around nozzle 24 and above the tank sump 36, at a level just slightly above the top surface of the bottom wall 70 of tank 20. Unit 188 is in fact attached to eductor 46 by three generally triagnular plates. Two of which are visible at 202 and 204 in FIG. 1. These plates radiate outwardly from sleeve 200 in equally angularly spaced planes passing through axis X—X. The plates have vertical inner edges which are welded at their lower ends to sleeve 200 and the upper inclined edges of which are welded to the underside of eductor inlet 52. Thus, it will be appreciated that the coupling between eductor 46 and sleeve 200 is such that coupling unit 188 will turn when the eductor is turned. The scraper arms 38 and 40 are attached to coupling unit 188 and will therefore also turn with the eductor. As indicated previously, the eductor itself is coupled to the member 54 which depends from drive unit 42 and will therefore be rotated when the drive unit is operated.

Sleeve 200 of coupling unit 188 also serves as a bearing housing for maintaining the scraper arms rotationally centered with respect to axis X—X. Referring back to FIG. 3, a bearing sleeve 206 is provided for mounting inside the sleeve 200 of coupling unit 188. Bearing sleeve 206 has an external diameter substantially less than the internal diameter of sleeve 200 and is held inside sleeve 200 by three bolts 208 which project inwardly through sleeve 200 in equiangularly spaced positions, and the inner ends of which bear against and frictionally retain bearing sleeve 206. The inner diameter of sleeve 206 is selected so that the sleeve is freely turnable on an inner metal sleeve 210 (see FIG. 1) welded around the external surface of water inlet nozzle 24. Bearing sleeve 206 is made of an elastomeric bearing material sold under the trade mark THORDON and available from Thomson Gordon Limited of Hamilton, Ontario. It will be appreciated that, as eductor 46 is turned, the coupling unit 188, and with it bearing sleeve 206 will also turn with respect to nozzle 24 while the bearing arrangement represented by sleeves 206 and unit 188 will maintain the eductor and scraper arms centered with respect to axis X—X.

Coupling unit 188 additionally serves to provide a mounting for three scraper arms for the sludge collection sump 36 of tank 20. Two of these arms are visible at 212 and 214 in each of FIGS. 1 and 3. Referring particularly to FIG. 1, it will be seen that the sleeve 200 of coupling unit 188 extends below plate 198 of coupling 188. The cone scraper arms are attached to the sleeve 200 by lugs, one of which is visible at 216 welded to sleeve 200 below plate 198, and to each of which one of the cone scraper arms is bolted. Each of these arms is formed by an angle section strut which projects outwardly and downwardly from sleeve 200, and to the outer end of which is transversely welded a blade of similar cross-sectional shape. In FIG. 3, the strut and blade of arm 212 are denoted respectively 218 and 220. The arms are angled and arranged so that their blades scrape the inner surface of sump 36 as the sludge scraper assembly rotates, causing sludge which may have adhered to said surface to be dislodged and moved down by gravity to the sludge outlet 34.

The clarifier reaction cone 44 is a sheet metal fabrication and is in fact in the shape of a pyramid having an octagonal base (see FIG. 2). At its upper end, the cone is supported by an octagonal sleeve 222 which is coupled to the cone by angle section coupling elements generally indicated at 224 attached respectively to the cone and to the sleeve and welded to one another. At its upper end, sleeve 222 is fitted with angle section brackets 226 which in effect define a flange around the top of the sleeve and by which the sleeve is bolted to the main support beam 88. Guy rods, two of which are indicated at 228 and 230 in FIG. 1 also extend between beam 88 and the cone for stabilizing the cone. Each guy rod includes a turnbuckle 232 and 234 respectively by which the length of the associated rod can be adjusted for adjusting the installed position of the cone.

The apparatus includes an array of tube settlers generally indicated at 68 in FIG. 1 disposed in tank 20 just below the level L of the liquid therein. FIG. 4 shows part of this array in detail. The array is made up of a plurality of tube settler sections which cover the whole of the surface area of the tank with the exception of the area occupied by the reaction cone support sleeve 222. The arrangement of the sections is indicated by the lines denoted 236 in FIG. 2. Each tube settler section is in the form of a plastic extrusion comprising a plurality of square section tubes 238 disposed in a tightly packed arrangement with each tube disposed at a relatively shallow inclination to the vertical. The sections are supported on cross beams, one of which is indicated at 240 in FIG. 4. As water in tank 20 rises in the tank towards the outlet launders, it will enter the settler tubes in the generally vertical direction, but due to the inclination of the tubes, will be deflected laterally to some extent. This will cause floc particles in the water to fall down onto the lower sides of the tubes generally as indicated by reference numeral 242 in FIG. 4. These particles will thus collect inside the tubes and form a sludge which will tend to slide out of the tubes by gravity as indicated by reference numeral 40.

By way of further explanation, when pin point floc particles settle in a vertical direction the rate of fall is governed by Stokes Law. However, if they settle in an incline tube the vertical distance that they must settle is reduced to 2-3 inches. Once the particle reaches the inclined tube surface it slides down the tube to form a fine sludge. When this fine sludge is discharged from the bottom of the tubes it will have sufficient mass to settle into the suspended sludge blanket 63 below where it will gradually agglomerate and coagulate to a point where it is large enough to reach the floor of tank 20. The application of tube settlers to remove pin point floc particles will permit the clarifier to produce a sparklingly clear effluent.

The tube settlers also have the advantage that they allow the apparatus to be operated at a higher rise rate (throughput of water) than would otherwise be possible. Thus, the tube settlers will remove relatively light floc particles which would otherwise settle out only if the water in which the particles are suspended was allowed to remain quiescent in the tank for a much longer period than is necessary with the present apparatus. A further advantage of the present design is that it allows a large area of tube settlers to be provided as discussed previously.

To summarize, in the apparatus shown in the drawings mixing, coagulation, flocculation and gravity settling take place in the same tank, while at the same time, the extensive gentle turbulant mixing and sludge recirculating required for efficient coagulation and flocculation can be achieved. This is accomplished by taking advantage of the energy ordinarily available in the incoming liquid. Thus, the overall efficiency of the chemical treatment system is dependent on the combined efficiency of each of the individual unit process that make up the system (e.g. mixing, coagulation, fluccuation and clarification). The system efficiency increases tremendously if the settled floc particles can be gently recirculated within the coagulation and flocculation zone. This action induces chemical coagulation and flocculation to take place on the surface of already formed floc to produce large, denser particles having better settling characteristics. The apparatus provided by one inventor is designed to maximize the operating efficiency of each of the four basic unit processes which make up the overall chemical treatment system.

The relatively quiescent area (outside the cone) allows for gravity settling and is designed for maximum utilisation of tube settlers for efficient removal of pin point floc and production of a sparklingly clear effluent. In this area, not only does gravity settling take place, but also floc "blankets" tend to form as discussed previously which act to filter small floc particles from the water as it rises in passing to the launders. Also, the tube settlers provide for final removal of fine floc particles which have not already settled out by the time the water approaches the launders. Both inner and outer launders are provided for the purpose of assuming a reasonably uniform flow of water through the tube settlers across the entire area of the tank.

The intensity of the mixing imparted by the water inlet nozzle 24 can be adjusted by varying the position of the device 118 in the nozzle as discussed previously. Thus, the optimum mixing effect for any particular liquid input will depend to some extent on the amount of solids present in the liquid. Generally speaking, a more turbulent mixing action is required for liquids having a high solid content than for liquids containing less solids. In other words, the apparatus is adjustable according to the nature of the liquid being processed.

It will of course be appreciated that the preceding description relates to a particular embodiment of the invention and that many modifications are possible within its broad scope. For example, while the specific description refers to a sludge scraper assembly, it is to be noted that other forms of sludge conveyor means may be employed. In another embodiment, a screw type sludge conveyor could be employed, for example, as disclosed in U.S. Pat. No. 4,005,019. Another possibility would be to use a slat-type chain conveyor as disclosed in the Tark U.S. patent discussed above.

With continued reference to the sludge removal means, it should also be borne in mind that it is not essential to employ a vertical drive shaft for operating the sludge conveyor. In the case of a slat-type conveyor, for example, no such shaft would be required. In other cases, a submersible motor could be employed for driving the sludge conveyor means.

In most applications of the apparatus, the influent liquid will be pumped to the apparatus at a velocity sufficient to ensure that liquid entering the tank will flow through the eductor and recirculate as described. Thus, it is intended that the apparatus will ordinarily take advantage of the relatively high energy level imparted to the liquid by pumping equipment. However, in the event that the velocity of the liquid should be insufficient, it would of course be possible to provide auxiliary pumping means in association with the apparatus for achieving the required velocity. Also, it should be noted that the deflection baffle 112 is not essential. In an alternative embodiment the top of the clarifier reaction cone could be closed or fitted with means to laterally deflect liquid leaving the eductor member. In other cases, no physical baffle may be needed.

Other detail modifications include the possibilities that tank 20 may be made of steel and that the sludge scraper assembly may include one or more scraper arms.

Finally, it should be noted that the apparatus provided by the invention can be used not only for water purification, but also for removing suspended particles from other liquids, e.g. in the treatment of domestic sewage or industrial waste waters. The term "particles" is to be interpreted broadly as including not only solids but also colloidal suspensions.

What I claim as my invention is:

1. Liquid treatment apparatus comprising:
    a tank for containing a body of liquid and having a bottom wall;
    an inlet for liquid to be clarified disposed generally centrally of said bottom wall and extending about a generally vertical axis, said inlet being arranged to direct influent liquid generally vertically upwards in said tank;
    a generally conical partition member extending about said axis and disposed in said liquid above said inlet so that a liquid circulation zone is defined below said member;
    a tubular eductor member disposed generally vertically below said generally conical member on said vertical axis and arranged so that liquid entering the tank from said inlet flows upwardly in said member, said member having an open upper end from which liquid enters said liquid circulation zone, and an open lower end disposed relative to said liquid inlet so that liquid entering the eductor member from the inlet entrains surrounding liquid and establishes a recirculation of liquid below said partition member;

deflector means disposed above said open upper end of the eductor member and arranged to outwardly deflect liquid leaving said member;

liquid outlet means disposed generally at the level of the surface of said body of liquid and through which clarified liquid can leave the tank;

sludge outlet means disposed generally centrally of the bottom wall of said tank and through which settled particles can be removed as a sludge; and a sludge scraper assembly which is rotatable in the tank about said generally vertical axis and which is rotationally located with respect to said axis, said assembly including: said tubular eductor member; scraper means adapted to move over said bottom wall of the tank as said assembly rotates and to convey settled particles towards said sludge outlet; drive means supported above the level of said body of liquid for rotating said scraper means; a driving member drivably coupled to said drive means, said driving member extending down into the tank generally along said axis and being rotatable about said axis when said drive means is operated; said tubular eductor member being coupled to said scraper means and to said driving member so as to transmit rotational movement of said driving member to said scraper means and cause the latter to convey settled particles to said sludge outlet.

2. Apparatus as claimed in claim 1, wherein said eductor member is shaped to define a throat immediately downstream of said liquid inlet considered in the direction of liquid flow through said inlet, whereby the eductor member defines a venturi for entraining said surrounding liquid.

3. Apparatus as claimed in claim 2, wherein said eductor member comprises a center section of substantially constant cross-sectional shape defining said throad; an outwardly flared top section at said open upper end of the eductor member; and an inlet of generally conical shape extending around said liquid inlet.

4. Apparatus as claimed in claim 1, further comprising; a support beam extending transversely of said tank above the level of liquid therein; a tubular support member suspended from said beam and coupled to said partition member whereby said partition member is supported in the tank, said support member being of tubular shape and providing access to said liquid circulation zone below said partition member; and chemical feed means extending down through said support member and communicating with said liquid inlet for permitting chemicals to be added to influent liquid.

5. Apparatus as claimed in claim 1, wherein said liquid inlet is in the form of a tubular nozzle having a discharge opening and includes flow adjustment means disposed in said opening and adjustable axially of said tube to vary the effective size of said discharge opening and thereby adjust the volume of liquid entering the tank from said nozzle.

6. Apparatus as claimed in claim 5, wherein said driving member of the sludge scraper assembly is of tubular form, and wherein said flow adjusting means is operable by a rod which extends longitudinally through said driving member and is adjustable axially thereof to vary the position of said flow adjusting means.

7. Apparatus as claimed in claim 1, wherein said sludge outlet means comprises a sump disposed generally centrally of the floor of the tank and having a generally concial side wall, and a sludge outlet pipe extending outwardly from said sump for conveying sludge from the tank, and wherein the liquid inlet comprises a tubular nozzle which extends upwardly from said sump, and wherein the apparatus further comprises a sump scraper means coupled to said sludge conveyor means for rotation therewith and operable to scrape sludge from said conical side wall of the sump.

8. Apparatus as claimed in claim 1, wherein said liquid inlet is in the form of a tubular nozzle disposed generally vertically in the floor of said tank, and wherein the scraper assembly is rotationally located by bearing means turnably mounted on said tubular nozzle, and bearing housing means carried by said eductor member and housing said bearing means.

9. Apparatus as claimed in claim 1, further comprising an array of tube settlers disposed in said tank so as to lie just below the surface of said body of liquid in use and extend over substantially the entire surface area of the tank, said array comprising a plurality of inclined tubes through which liquid in the tank passes in flowing towards said liquid outlet means and in which fin suspended particles are caused to settle out of the liquid.

10. Apparatus as claimed in claim 9, wherein said liquid outlet means comprises inner and outer launders arranged at the level of the body of liquid in the tank so that liquid entering the tank from said inlet causes the body of lqiuid to overflow into said launders, said outer launder extending around the periphery of the tank, and said inner launder being disposed in an intermediate region of the tank and being coupled to said outer launder, said outlet means further comprising a treated water outlet pipe coupled to said outer launder.

* * * * *